(12) United States Patent
Steer (10) Patent No.: US 8,254,969 B1
(45) Date of Patent: *Aug. 28, 2012

(54) WIRELESS COMMUNICATION NETWORK HAVING A BROADCAST SYSTEM FOR INFORMATION DISTRIBUTION

(75) Inventor: David Steer, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,064

(22) Filed: Jun. 17, 2011

Related U.S. Application Data (63) Continuation of application No. 10/877,283, filed on Jun. 25, 2004, now Pat. No. 7,986,954.

(51) Int. Cl.
*H04W 68/00* (2009.01)

(52) U.S. Cl. .................................................. 455/458

(58) Field of Classification Search .............. 455/458, 455/456.1–456.5, 99, 3.06, 566, 1, 66, 404.2, 455/515, 62, 89, 73, 552.1, 553.1, 557, 466, 455/33.1, 38.1, 436, 426.1, 457; 379/59, 379/61, 209, 100, 63, 37, 45, 38, 39, 46, 379/102.02, 102.03, 102.04; 725/100, 81, 725/80, 131; 709/220, 232, 103; 704/270.1

See application file for complete search history.

(56) References Cited

U.S. PATENT DOCUMENTS

| | | | |
|---|---|---|---|
| 5,131,020 A | 7/1992 | Liebesny et al. | |
| 6,553,100 B1 * | 4/2003 | Chen et al. ................. | 379/37 |
| 6,584,082 B1 | 6/2003 | Willis et al. | |
| 6,711,418 B1 | 3/2004 | Wang et al. | |
| 6,711,474 B1 | 3/2004 | Treyz et al. | |
| 6,928,261 B2 | 8/2005 | Hasegawa et al. | |
| 6,961,556 B2 | 11/2005 | James et al. | |
| 6,987,946 B2 | 1/2006 | Sinclair | |
| 6,999,083 B2 | 2/2006 | Wong et al. | |
| 7,027,767 B2 | 4/2006 | de La Chapelle et al. | |
| 7,031,681 B2 | 4/2006 | Nagamura | |
| 7,099,682 B2 | 8/2006 | Ben-Eli | |
| 7,149,469 B2 | 12/2006 | Russell | |
| 7,158,753 B2 | 1/2007 | Kagan et al. | |
| 7,215,965 B2 | 5/2007 | Fournier et al. | |
| 7,218,611 B2 | 5/2007 | Mimura et al. | |
| 7,283,850 B2 | 10/2007 | Granovetter et al. | |
| 7,689,226 B2 | 3/2010 | Sinnarajah et al. | |

(Continued)

*Primary Examiner* — Melody Mehrpour
(74) *Attorney, Agent, or Firm* — Meyertons, Hood, Kivlin, Kowert & Goetzel, P.C.

(57) ABSTRACT

A communication network (100) includes a two-way communication system (101) having a number of base stations (102-108) providing corresponding coverage areas (110-116) for one or more mobile terminals (148 and 150). In order to minimize congestion of the two-way communication system (101) a broadcast system (118) is included which allows for messages to be transmitted to the mobile terminals (148 and 150). Provision of such a broadcast system frees-up network resources that would otherwise be required to support the transmission of such messages. In one embodiment, the communication network (100) includes a number of information gathering devices such as traffic cameras (126-136) that collect information on traffic conditions within the communication network (100). By determining the location of the mobile terminals (148 and 150) and their intended journey routes, or based upon travel information previously provided to the network, the communication network (100) can transmit via the broadcast system (118) images of traffic conditions along one or more particular travel routes to the mobile terminals (148 and 150). The mobile terminals (148 and 150) include receiver sections for receiving both the messages transmitted by the two-way communication system (101) and the one-way broadcast system (118).

20 Claims, 3 Drawing Sheets

U.S. PATENT DOCUMENTS

| | | |
|---|---|---|
| 7,729,919 B2 | 6/2010 | Wang |
| 7,751,804 B2 | 7/2010 | Steelberg et al. |
| 7,986,954 B1 | 7/2011 | Steer |
| 2002/0025825 A1 | 2/2002 | Hirayama et al. |
| 2002/0164962 A1 | 11/2002 | Mankins et al. |
| 2003/0073446 A1 | 4/2003 | Tsuchiya |
| 2003/0083048 A1 | 5/2003 | Robinson et al. |
| 2003/0087650 A1 | 5/2003 | Aarnio |
| 2005/0246417 A1 | 11/2005 | Raith et al. |
| 2005/0278763 A1 * | 12/2005 | Huai .......................... 725/100 |
| 2006/0040610 A1 | 2/2006 | Kangas |
| 2006/0234708 A1 | 10/2006 | Aaltonen |

* cited by examiner

WIRELESS COMMUNICATION NETWORK HAVING A BROADCAST SYSTEM FOR INFORMATION DISTRIBUTION

CROSS-REFERENCE TO RELATED APPLICATIONS

This is a Continuation Application of U.S. patent application Ser. No. 10/877,283 filed on Jun. 25, 2004 and entitled "Wireless Communication Network Having a Broadcast System for Information Distribution," which is hereby incorporated by reference herein in its entirety.

FIELD OF THE INVENTION

This invention relates in general to the field of wireless communication networks and more particularly to a wireless communication network having a broadcast system for information distribution.

BACKGROUND

A typical method of delivering information to communication devices, which are part of a wireless communication network, includes the use of messages such as Short Message Service (SMS) or Multi-Media Message Service (MMS) messages. SMS and MMS messages are used in wireless communication systems such as the Global System for Mobile Communications (GSM) or the Universal Mobile Telecommunications System (UMTS). Although the use of individual SMS or MMS messages or other types of messages directed to individual communication devices operating within a wireless communication network is beneficial in some situations, use of such individual messages may quickly congest the wireless communication network with multiple messages that may be carrying substantially the same or similar information to more than one wireless communication device. This results in either longer communication delays or the blocking of mobile services for communication network users (e.g., delays in making a voice call, etc.) Therefore, a need exists in the art for a method, apparatus and system that can provide for sending information to multiple users operating within a wireless communication network in an efficient manner.

SUMMARY OF INVENTION

In accordance with a first aspect of the invention, a wireless communication system includes a two-way communication system having a plurality of base stations each providing communications over a coverage area. The wireless communication system also includes a one-way broadcast system having a coverage area that overlaps a portion of the two-way communication system's coverage area. A plurality of wireless communication devices operate within the two-way communication system but can also receive message transmitted by the one-way broadcast system.

In a second aspect of the invention, a plurality of information gathering devices are coupled to the two-way communication system and the information gathered by the information gathering devices is transmitted by the one-way broadcast system to one or more of the plurality wireless communication devices. In one aspect of the invention, the information gathering devices are traffic cameras that take visual images of traffic conditions.

In a third aspect of the invention, a wireless communication device includes a transmitter for transmitting messages to a two-way communication system and a receiver for receiving messages from the two-way communication system. The wireless communication device also includes a second receiver section for receiving broadcast messages from a one-way broadcast system.

In a fourth aspect of the invention, a method for directing the transmission of information to a wireless communication device operating within a two-way communication system and which can also receive information transmitted from a one-way broadcast system includes determining the location of the wireless communication device and using the information to determine if the one-way broadcast system can be used to transmit a message to the wireless communication device. A message is transmitted to the wireless communication device using the one-way broadcast system if it is determined from the location information that the wireless communication device is within communication range of the one-way broadcast system.

In still another aspect of the invention, a communication network includes a two-way communication system and a one-way broadcast system. The communication network also includes an information distribution server coupled to the one-way broadcast system; the information distribution server receives information to be transmitted by the one-way broadcast system along with information regarding the location of one or more of the communication devices that use the communication network and schedules transmission of the information by the one-way broadcast system.

In a further aspect of the invention, a network controller includes inputs/outputs for coupling to a two-way cellular system and a one-way broadcast system and a means for determining which messages directed to a mobile terminal are to be transmitted via the two-way cellular communication system and which messages need to be transmitted to the mobile terminal using the one-way broadcast system.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION OF THE EMBODIMENT(S)

While the specification concludes with claims defining the features of the invention that are regarded as novel, it is believed that the invention will be better understood from a consideration of the following description in conjunction with the drawing figures.

Figure 1:
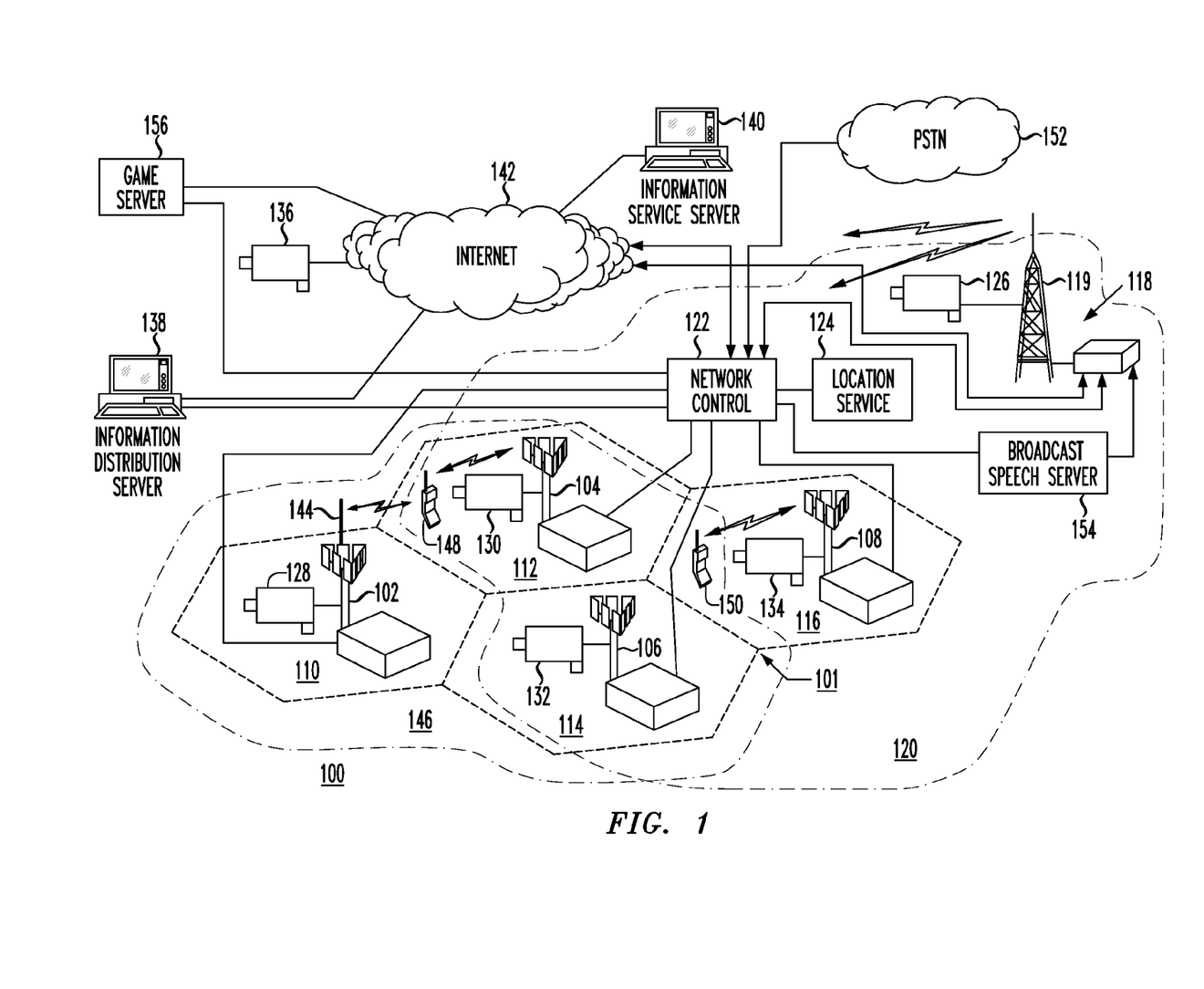
FIG. 1 shows a diagram of a wireless communication network in accordance with an embodiment of the invention.

Referring now to FIG. 1, there is shown a diagram of a wireless communication network 100 in accordance with one embodiment of the invention. Wireless communication network 100 includes a communication system 101 that includes a plurality of base stations or cell sites 102, 104, 106 and 108 that are coupled to a network control (or network controller) 122. As shown, base station 102 has a corresponding coverage area 110, base station 104 has a coverage area 112, base station 106 has a coverage area 114 and base station 108 has a coverage area 116.

The network controller 122 provides all of the necessary control functions typically associated with the wireless communication system 101. The wireless communication system 101 can be a cellular telephone system or some other type of two-way wireless communication system. The network controller 122 provides coordination between various elements of the wireless communication network 100 such as the base stations 102-108, Internet 142, the Public Switched Telephone Network 152 and Mobile Terminals (MTs) 148 and 150. Each base station 102-108 provides the necessary radio frequency (RF) link within corresponding coverage areas 110-116 between the MTs 148 and 150 and the rest of the wireless communication network 100.

In accordance with an embodiment of the invention, a broadcast system 118 is provided for transmitting broadcast messages to one or more of the MTs 148 and 150. Broadcast system 118 is shown having a first antenna/transmission site 119 having a coverage area 120 comprising substantially base station coverage areas 112, 114, and 116. The broadcast system 118 can comprise one or more frequency channels and can include other transmission sites such as second antenna/transmission site 144, which can optionally be co-located or positioned in close proximity to an existing base station, such as base station 102, and having coverage area 146 comprising substantially base station coverage areas 110, 112, and 114. The various antenna/transmission sites may use the same or a different frequency channel as the other broadcast transmission sites. The number of transmission sites and/or channels used for the broadcast system 118 can be selected to suit the traffic loading conditions of the particular system being designed. More broadcast transmission sites may be used in areas where user loading is high in order to properly accommodate all of the system users.

The broadcast channel used by the broadcast system 118 may comprise a one-way channel that is part of a local television or audio broadcast station transmission. For example, the broadcast information that is transmitted by the transmission sites 119 and/or 144 can be transmitted as a sub channel of a standard TV or audio system such as the Digital Video Broadcast-Terrestrial (DVB-T) as outlined in European Telecommunication Standards Institute (ETSI) standard EN300-744. Alternatively, the broadcast channel can be a dedicated frequency channel allocated for the wireless network 100.

The broadcast system 118 is used to deliver information that may be commonly desired by many users (e.g., MTs 148 and 150) operating within the wireless communication network 100. The use of an auxiliary broadcast system 118 makes available capacity for the broadcast traffic without congesting the regular, two-way mobile channels of the wireless communication system 101.

In the embodiment shown in FIG. 1, the messages transmitted by the broadcast system 118 (including transmission sites 119 and 144) includes information in the form of traffic images that are collected from a number of information sources such as traffic cameras ("traffic cams") 128, 130, 132, and 134 located strategically throughout the wireless communication network 100 and which also may be remotely located such as camera 136, which is coupled via the internet 142 to the rest of the system, or camera 126 located close to the broadcast system 118. For those traffic cams 128-134 located within communication system 101, the traffic images collected at each of the cell sites 102-108 can be sent to the network controller 122 which can then forward the information to the broadcast system 118 using for example a wireline or wireless interconnection. Traffic cam 136 which is coupled to the Internet 136 for example via a computer, can forward the images it has collected via the Internet 142 directly to the broadcast system 118 or as another example, the traffic images can first go to the network controller 122 before being sent to the broadcast system 118, depending on the specific system design. The information sources such as cameras 128-134 may be coupled to the communication system 101 or to broadcast system 118 in the case of camera 126 using either a wired or wireless connection.

In another embodiment of the invention, the network controller 122 determines whether a particular message needs to be sent to one or more MT(s) using either the two-way cellular system 101 or the one-way broadcast system 118. The network controller 122 can make the determination based on, for example, the type of message that needs to be forwarded (e.g., traffic image), or some other type of criteria. The network controller 122 in one embodiment can use hardware, software or a combination of the two to make the determination as to which communication system should transmit the message to one or more of the MTs. The network controller 122 is coupled to both the one-way broadcast system 118 and the two-way cellular system 101. In one illustrative example, the messages that are to be sent to the MTs 148 and 150 may include message type information (e.g., message type ID) that may be decoded by the network controller 122. The network controller 122 based on the message type information, causes the message to be transmitted by the appropriate communication system (cellular system 101 or broadcast system 118). The selection of which of the systems to use to communicate with one or more MTs may also be determined by the network controller 122 based on the geographical location the one or more MTs. This location information may be provided by location service 124 or by other means to the network controller 122.

In still another embodiment of the invention, messages may comprise information found from an information source on the Internet 142 (e.g., weather forecast information, etc.) that can also be transmitted to MTs 148 and/or 150 using broadcast system 118. The messages transmitted by broadcast system 118 can also include information such as audio and/or visual weather reports, traffic reports, flight times at nearby airports, parking directions, traffic or emergency announcements by police or emergency personnel, etc.

As part of the embodiment shown in FIG. 1, a location service 124 is coupled to the network controller 122 and collects information on the location of each of the MTs 148 and 150. The location service 124 may include a database showing the current location (e.g., which coverage area 110, 112, 114 or 116) a particular MT 148 or 150 is located within. The location information can be gathered using information already collected by the wireless communication system 101 such as cell site hand-off information, registration information, etc. In an alternative embodiment, location information can be gathered using Global Positioning Satellite (GPS) information that may be transmitted by MTs 148 and 150 using onboard GPS receivers and collected by the location service 124, or by a combination of known location (also referred to as "position determination") techniques. The location service 124 can be implemented as an infrastructure side device as shown in FIG. 1, or the function can be performed partially or fully at the mobile side (e.g., MTs 148 and 150)

depending on the particular system design. The location service 124 informs the various elements of the communication network 100 where a particular MT is located.

An Information Distribution Server (IDS) 138 is located in the wireless network to provide the information management, scheduling, signaling and the encoding of information, for example traffic images that are to be broadcast by the broadcast system 118. The information provided by the location service 124 regarding the present location of one or more of the MTs 148 and/or 150 is used to determine which transmission sites (e.g., transmission site 119 and/or 144) sends the broadcast message to the particular MTs, given their present location and the coverage areas for the different transmission sites. The IDS 138 assembles the sequence of the required information to be broadcast, in the illustrative example shown in FIG. 1, the traffic images collected by cameras 126-136, and schedules when the broadcast system transmits the required information and also which of the transmission sites the information is sent from given the location of the MTs that the broadcast message is targeting. In the embodiment shown in FIG. 1, the MTs 148 and 150 can forward information to the IDS 138 via the network controller 122. In one particular network design, the IDS 138 may schedule when the broadcast system 118 transmits particular messages to the MTs 148 and 150 by waiting first to collect all the necessary route information for all of the MTs and then sending information packets to the broadcast system 118 either via the Internet 142 or via network controller 122 along with information as to when the information needs to be transmitted. Alternatively, the broadcast system 118 can transmit the information packets sent by the IDS 138 as soon as it receives them.

In another embodiment, the broadcast system 118 can be used as a push-to-talk (PTT) broadcast service by the MT wherein the IDS 138 supervises the broadcast of speech to/from the individual MTs 148 and/or 150 and the broadcast system 118. Speech from a particular MT may be uploaded via the communication system 101 and subsequently broadcast via the broadcast system 118. The speech can be sent in a packet format such as Voice-over-IP (VoIP) packets or in another alternative embodiment in a standard digital audio format such as the Moving Picture Experts Group (MPEG) 4 format. The broadcast channel provided by the broadcast system 118 can be used to provide a common speech service channel to MTs located throughout the coverage area of the broadcast system 118. This common channel would enable a user to speak into their MT and have their message be heard by other users who may for example subscribe to such a service. This service can also provide a "chat" feature for subscribers located within the coverage area of the broadcast system. Although a common application of this form of "chat" service is for speech, the service can equally well be applied for distribution of text or other data messages or imagery.

In other embodiments, the speech originating at a user's MT (e.g., MT 148 or 150) can be uploaded to the system and broadcast in a number of ways. As illustrative example, the speech can be sent using a speech channel found in communication system 101 to a Broadcast Speech Server (BSS) 154 located within the communication network 100. The BSS 154 functions in a similar fashion to a conference bridge in a voice network in that BSS 154 bridges (e.g., via network controller 122) the speech from an MT to the broadcast system 118 for transmission. Alternatively, the speech can be incorporated into packets in the MT and sent to the BSS 154 using the data transmission services of the communication system 101 and subsequently bridged to the broadcast system 118. The BSS 154 can repackage the speech, if necessary, to suit the broadcast channel that is to be used. For example, the speech can be transmitted in a packet format as part of a data service, for example using Voice-Over-IP (VoIP.)

The BSS 154 can also function to combine the speech from several speakers at once. Thus, if two speakers talk at once, both will be broadcast. Normally the resulting combination of several voices will be unintelligible, and one speaker may stop talking and try again later. To prevent this problem, some conference bridges simply broadcast the loudest of the incoming speech signals. Because of this possibility of "double-talk" it is customary for the speaker to also be able to hear the broadcast signal as this enables them to hear when there is an interruption.

In situations where the sender of the speech is also receiving the broadcast, the sender will be receiving a delayed version of their speech. Delay in hearing one's voice can make talking difficult and some care must be exercised to mitigate the effect of the delays. In audio networks such as the PSTN 152, echo control equipment is used to cancel or suppress the echoes that appear as a result of transmission delays.

In this broadcast scenario, the effects of the transmission delays for the originating user may be mitigated in the user's terminal by canceling (e.g., subtracting) a copy of the user's speech from the received broadcast speech. As the broadcast reception will be delayed from the time the original is sent, the terminal must remember by for example keeping a record of the speech and at a later time subtracting the recorded speech from the broadcast audio signal. This subtraction process must be adjusted for the appropriate delay in the transmission path from the MT to the server and back from the server via the broadcast channel to the MT, and also for audio volume. As part of the PTT function in the user's terminal, the terminal should perform this subtraction function on the incoming broadcast speech. However, only the sender of the speech, and thus only one terminal, need do the cancellation.

To assist the process of determining which terminal needs do the cancellation, the BSS 154 can include as part of a broadcast stream, the identity of the originator of the speech, for example, by using the MT's address or other identification. The MTs receiving the broadcast thus need only do the echo cancellation if they recognize their address as the originator of the speech. To assist the synchronization of the cancellation in order for example to permit accurate compensation for the path delay, the originating MT should label the speech packets sent and recorded with a sequence number or some other designator. The BSS 154 can include the sequence number together with the identity number, so that the originating MT can do its cancellation with the appropriately delayed parts of its recording. This method will assure that the speech chat service users will receive a suitable quality of speech if they are able to hear their own broadcasts.

In still another embodiment, the speech can be sent in a digital-audio format using one of the audio service formats (e.g., MPEG4) of the broadcast system 118. The use of the digital-audio formats for either, or both, the upload and the broadcast message has the advantage of minimizing delay in the delivery of the speech sounds. This may be important in some applications such as command and control applications. However, this method may use more broadcast system capacity and bandwidth. If delay in the speech delivery is not so critical, the packet speech method may provide an advantage given that it uses less bandwidth.

In another embodiment of the PTT service, a user such as a policeman can use the broadcast channel to make emergency announcements or to provide instructions to traffic across a wide area. This would be useful for emergency vehicles, police and security personnel attending to an incident. As an example, a traffic officer may send an announcement about a traffic accident to warn approaching motorists. In another application, an approaching ambulance, fire or other emergency vehicle can send a warning that it is approaching a certain location by broadcasting its "siren" over the broadcast channel to the vehicles having MTs that are nearby. The vehicles selected to receive the siren would include those in front of the emergency vehicle's path and those approaching pending intersections, but not those vehicles that are behind the emergency vehicle or traveling in other lanes of traffic. This would avoid the confusion on the roadway that often associates with the sound of a siren and hopefully avoid additional peripheral accidents.

As emergency vehicles usually include at least one other person in addition to the driver, one of these persons can serve as the navigator who can watch the traffic cam images being delivered to the MT. Such information would enable the emergency vehicle to avoid congestion in its routing and minimize the delay in its arrival. The navigator would be able to make informed decisions on routing based on real-time availability of road conditions. In addition, with the availability of junction and routing information, the ISS 140, described in detail below, that is requesting the traffic cam images for the route can also communicate with the traffic control network using the communication system's 101 signaling functions such as SMS to clear traffic controls (e.g., set the traffic lights to green) for their planned route. This would have the advantage of speeding the transit of the emergency vehicle.

In another embodiment, the "chat" feature comprises collective gaming, wherein the users receive broadcast information about the scenario and state of play of a particular game. This information is sent via the broadcast system 118 and the IDS 138, from a game server 156 that may be coupled via a communication network such as the Internet 142 to the network controller 122 or may be located in the communication system 101. The users (e.g., subscribers to the game) interact with others via their MT (e.g., MT 148 or 150) to make "moves", for example, by using a keyboard and display incorporated into or associated with the MT. Their moves are communicated to the game server 156 via the mobile communication system 101, for example using SMS or MMS messages, and the "game" is distributed from the game server 156 using the broadcast system 118. This system has the advantage of efficiently distributing the game information with short delays to all players via the broadcast channel. The game server 156 stores the game and other associated information needed for the gaming embodiment.

It is the responsibility of the IDS 138 to manage the information flow to the various cell sites so that the needed information is broadcast in the appropriate cell site in order to reach each MT as needed. The IDS 138 may also need to change the delivery transport from the broadcast channel of broadcast system 118 to individual messages sent over the mobile communication system 101, in the case where the broadcast system 118 is busy or the user is outside the coverage area of the broadcast system 118. For example, an MT may move outside the coverage area of the broadcast system 118 and into a location where the MT is only covered by a cell site of the wireless communication system 101 as determined by location server 124 or a location function within the MT. When the MT 148 or 150 moves to a cell site that is not covered by the broadcast system 118, the IDS 138 directs that messages such as MMS messages be sent to that particular MT using the mobile communication system 101 and not the broadcast system 118. When the MT moves back to a location covered by the broadcast system 118, the IDS 138 automatically directs the messages to be sent via the broadcast system 118 in order to minimize the congestion of the wireless communication system 101.

In the traffic cam embodiment, an Information Service Server (ISS) 140 coupled with the wireless network 100 (e.g., via network controller 122 or internet 142) interacts with the MTs 148 and 150 and determines based on input of each of the MTs' planned routes and destinations, as well as alternate routing information, the desired set of information that should be transmitted to a particular MT or MTs. That is, ISS 140 serves as a content manager for information sent to and/or received from an MT. The set of information is then sent to the IDS 138 to request broadcast of the information by the broadcast system 118. The MT may also need to be informed via the communication system 101 of details on how to access the image on the broadcast channel (e.g., timing and coding). The ISS 140 although shown in FIG. 1 as part of the infrastructure can be located in the individual MTs 148 and 150 (as shown by Information Services block 218 in FIG. 2.) The ISS 140 interacts with the user and with the user's current location information, the planned route, planned destination, together with information on alternate routing to determine the desired set of information for the individual user. This set of information requests is sent to the IDS 138, which then requests broadcast of the relevant information to the MTs in need of the information.

As a particular MT moves along its route, it is the responsibility of the ISS 140 to keep track of the user's location as determined by location service 124 or a location function within the MT and to coordinate the broadcast via IDS 138 of the information needed along future route points (e.g., traffic images of the different route points, etc.) The ISS 140 will also send to the IDS 138 instructions about the information (e.g., traffic-cam images or radio programs, etc.) that need no longer be broadcast for that user. The IDS 138 may then stop the broadcast of that information if there are no other current users of the information. In the traffic-cam embodiment, if an MT user observes that their route is congested, blocked, experiencing bad weather, etc., the user may interact with the ISS 140 to select a new route. The ISS 140 would then request the traffic-cam images for the new route be sent to the MT.

The ISS 140 is shown in FIG. 1 as an infrastructure side device coupled to the broadcast system 118 via the Internet 142, although in another embodiment, the ISS function can be implemented as application software executed in the MTs 148 and 150 themselves. That is, planned routes and destinations (e.g., daily commuting route) may be uploaded to the ISS 140 via the Internet 142 or via input from the MT. Input from the MT may further safeguard the privacy of the MTs travel and routing information and potentially speed up the time between when a request for information is sent and when the broadcast system 118 transmits an information message.

The ISS 140 may interact with the IDS 138, or another server or element in the network to learn the resources that are available. The ISS 140 may, for example, request a listing of all the traffic-cams that are available for a particular highway route. On receiving the list, the ISS 140 can select the traffic-cams appropriate for the user's journey and issue request for those images and information. The frequency of information updates being sent to the user can be proportional to the distance the user is from the junction site. That is, the frequency of update of the traffic-cam images can be higher for those closest to the user's current location. The supposition in this case is that the conditions at more distant junctions are of less significance to the user than the nearby ones, as distant traffic conditions are more likely to change by the time the user gets there. The frequency of issuance of such updates can, of course, vary as well in accordance with the nature of the travel route, for example, the update frequency could increase as a subscriber approaches a highway interchange, even an interchange well in advance of the location of the situation giving rise for the update, so as to permit the subscriber to select an alternate route well in advance of traffic congestion, yet at a location where re-routing options could be limited.

The information to be transmitted by broadcast system 118 may be requested from many sources. Some requests may come from individual users (e.g., via an MT), but may also come from others, including sources located within the geographic confines of the communication system 101, the Internet 142 or the broadcast network 118. Some images or information can be at a cell site view, for example, the time or day, local weather conditions, local radio stations, etc.

MTs 148 and 150 can comprise a single device or a combination of devices working together. For example, the MTs 148 and 150 can comprise a laptop computer having a wireless transceiver and a broadcast receiver and corresponding service application software; a two-way radio communication device such as a cellular telephone having the capability of receiving the broadcast communications of the present invention as well as communication messages from communication system 101; or other wireless devices can also use the present invention. MTs 148 and 150 may be stand-alone devices or installed in a vehicle such as a car, truck, etc. In a vehicular setting, the MTs may include appropriate display capabilities, especially in the case where traffic images are being displayed to the user. The MT may also be coupled to a navigation system, whereby the navigation system provides the MT with current location and planned journey information that the MT can forward to the IDS 138 and ISS 140 to determine what images need to be broadcast. The video screen often associated with such navigation systems may also permit for the display of imagery delivered to the MTs.

Figure 2:
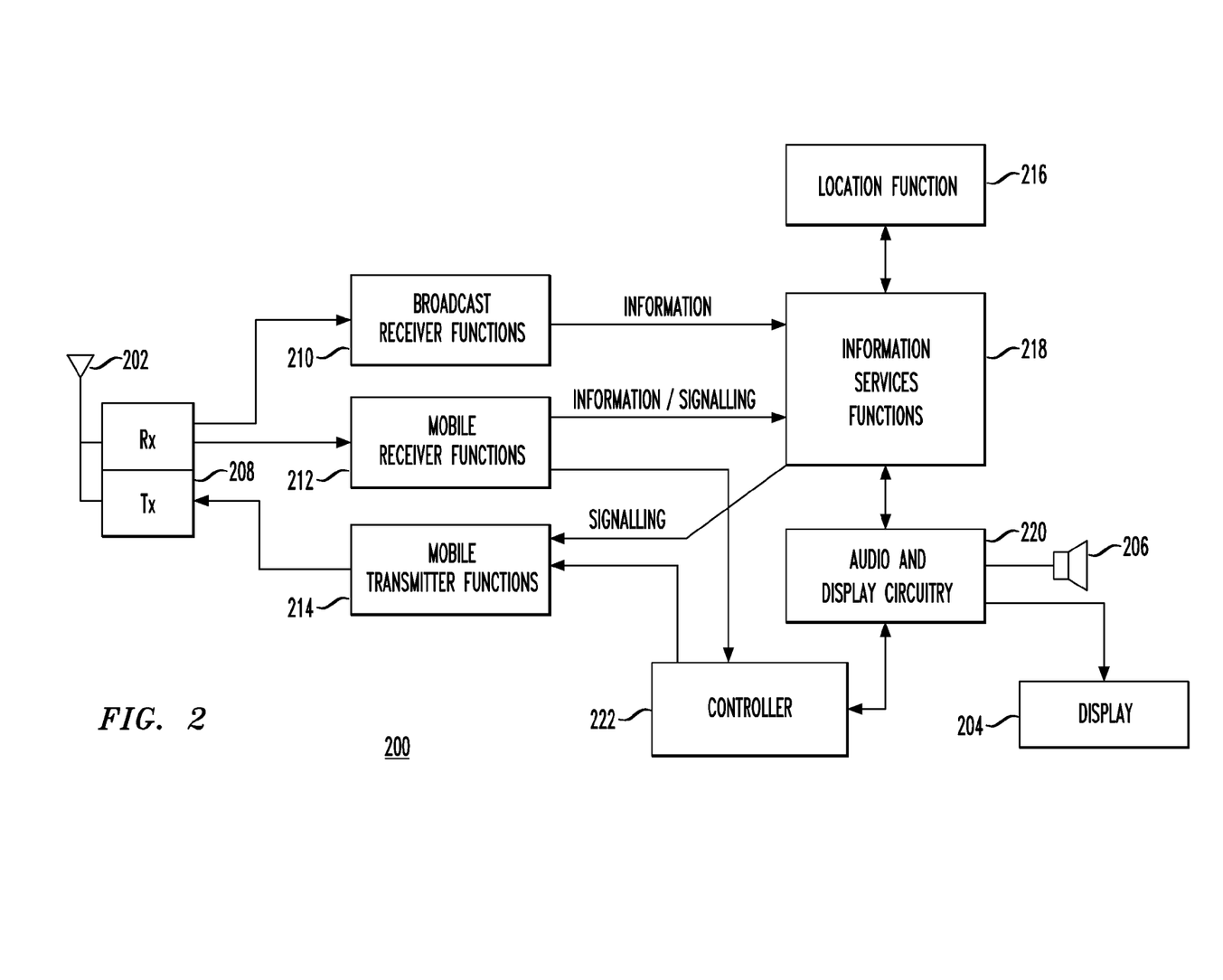
FIG. 2 shows a block diagram of a radio communication device in accordance with an embodiment of the invention.

In FIG. 2, there is shown a block diagram of a wireless communication device 200 such as MT 148 or 150 which can be used with the present invention. Communication device 200 includes conventional receiver 212 and transmitter 214 sections selectively coupled to an antenna 202 via a receive/transmit switch 208 for receiving and/or transmitting messages in the first communication system 101. In a further aspect of the invention, communication device 200 could be, as an illustrative example, a cellular telephone system having the capability to receive broadcast messages as discussed herein. A broadcast receiver 210 that can be implemented separately from the receiver section 212 or integrated with receiver section 212, depending on the particular design, is used to receive the broadcast messages transmitted by the broadcast system 118.

A controller 222 handles the overall control of wireless communication device 200. Controller section 222 can include a microprocessor, microcontroller, and/or digital signal processor, or other combination of hardware and/or software to perform the overall control function for communication device 200. An audio and display section 220 includes the necessary audio circuitry for presenting audio messages to speaker 206 and the necessary display driver circuitry for presenting messages on display 204.

The communication device 200 also optionally includes a location function block 216 that determines the location of the communication device 200. This can be accomplished during cell site hand-offs where the communication device 200 determines which cell site (e.g., 102-108) it is communicating with, or in other embodiments can include the use of different locating methods such as GPS for determining (or assisting in the determination of) the location of the communication device 200. The communication device as shown in FIG. 2 also optionally includes an information services function block 218 that functions to combine the location information from the location function block 216 with information regarding the content desired by the communication device user from the broadcast channel 118 (e.g., particular traffic cam images, given the particular route that the communication device 200 is currently traveling.) As previously mentioned and as shown by the information services block 218, in this example the ISS function (e.g., content manager function) shown by ISS 140 in FIG. 1 can be performed in whole or in part locally at each of the mobile terminals. The information services block 218 prepares the message(s) that are to be transmitted by the mobile transmitter 214 via the network controller 122 to IDS 138, which in turn communicates with the broadcast system 118 for transmission of the requested traffic cam images.

Figure 3:
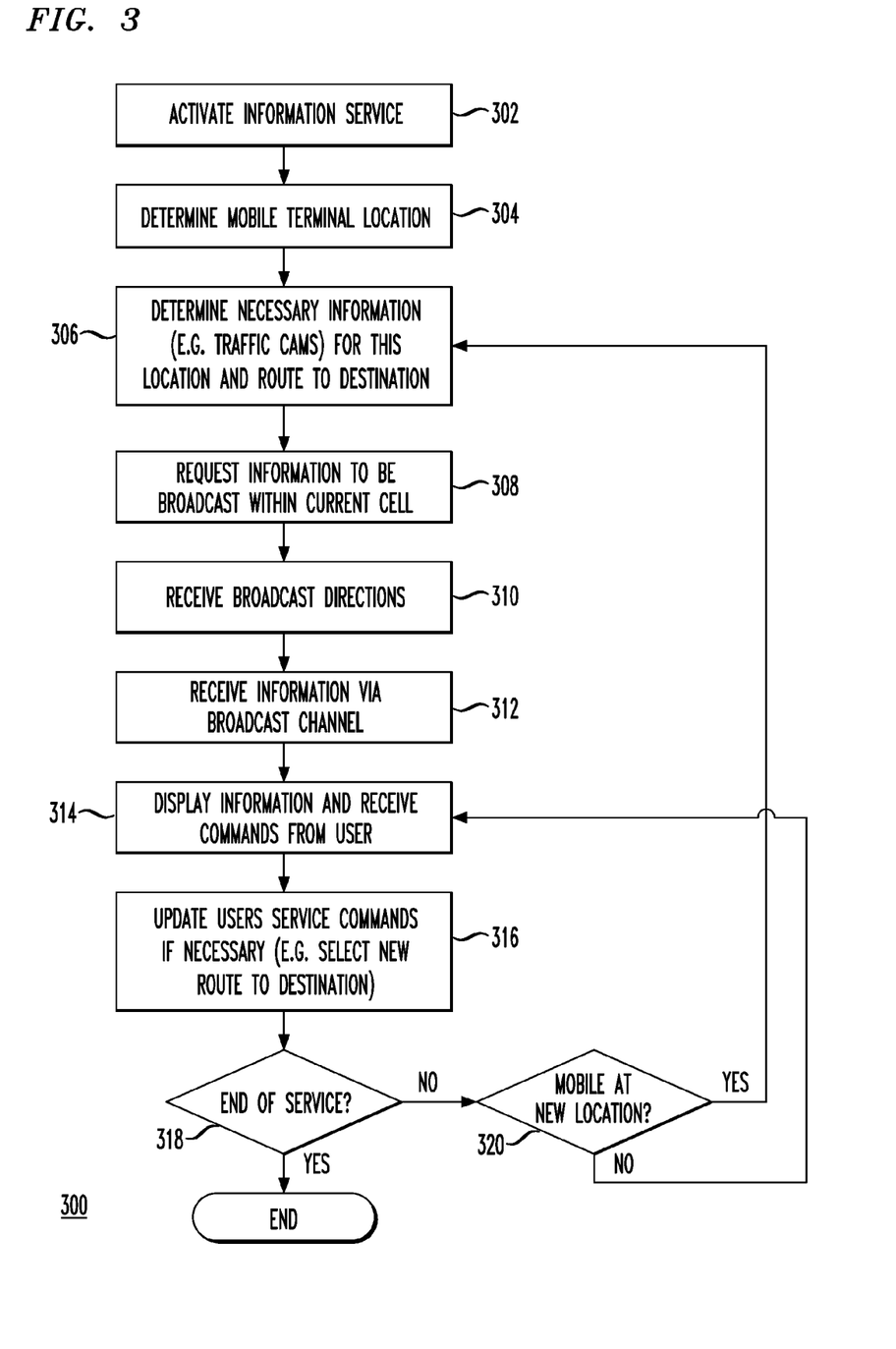
FIG. 3 shows a flowchart highlighting the sequence for directing information flow in accordance with an embodiment of the invention.

Referring now to FIG. 3, there is shown a flowchart 300 highlighting some of the steps taken by the information services block 218 in order to interact with the user, then request and display the sequenced information received from the broadcast system 118. In step 302, the user of the communication device such as MT 148 or 150 activates the information service on the device. In one embodiment shown in FIG. 1, the information service is the reception and display of traffic images at the communication device. Other information services can also be performed by the present invention such as the reception of weather information, emergency road conditions, gaming activities, etc. In step 304, the communication device determines its location or otherwise assists in determination of device location. This as previously discussed can be determined during cell site communications, such as hand-offs, etc. or by using other techniques such as GPS, A-GPS, etc. In step 306, the information services function block 218 determines the necessary information or content needed by the communication device as for example, determining the route entered by the communication device user and determining which of the traffic cam images are needed so that the communication device user can view the necessary traffic images while traveling the chosen route. In step 308, the information services block 218 has the transmitter 214 send a message requesting the information the user needs to receive via the broadcast system 118. This message is first received by the cell site whose coverage area the communication device 200 is presently located within and transferred via the network controller 122 to the IDS 138, which in turn requests that the appropriate information be transmitted by the broadcast system 118.

In step 310, the communication device optionally receives via its regular receiver section (e.g., receiver section 212 in the case of communication device 200) information regarding which broadcast channel will be used, etc. This information is then used to set the broadcast receiver (e.g., broadcast receiver 210) to the proper frequency, etc. In step 312, the broadcast receiver receives the broadcast message and forwards it to the information services block (e.g., information services block 218 in communication device 200.) The information services block then decodes the necessary information and in step 314 outputs for display the relevant information (e.g., traffic image based on the communication device's current location) on the communication device's display or the display of an associated device, such as the display screen of a vehicle navigation system. In step 316, the user can update the service commands if necessary, for example, in response to viewing the received image(s), the communication device user may decide to alter the route that is being traveled and enter new route information into the communication device.

This update information would be sent to the IDS 138 for appropriate action. In decision step 318, the routine determines if it is the end of the information service, if yes, the routine ends, if not, in decision step 320, it is determined if the MT is at a new location as determined by location function 216. If the MT is not at a new location, the routine loops back to step 314. If it is determined that the MT has reached a new location (e.g., new cell site, etc.) the routine loops back to step 306.

The traffic cam service delivers to the MT images from the traffic cams 126-134 along the MT's route or journey path uploaded by the user. As the MT progresses along the journey, the MT may receive not only information on the next traffic cam information that is along the planned path, but also images on traffic conditions further along the journey path. Given this information, the MT user can decide to alter the journey path in order to avoid bad traffic conditions. Although the information transmitted by the broadcast system 118 can take the form of traffic cam images, the information can also include audio information about traffic conditions (e.g., spoken by traffic coordinators or radio announcers, etc.). The broadcast messages can also include weather conditions, radio broadcasts or other warnings. The service is preferably tailored to the individual user journey path (e.g., a daily commute path) and the user is not burdened with information that is not associated with his/her journey path.

In order to provide adequate security and privacy for the MT users, the information sent over the broadcast system 118 can be transmitted in such a way that the user's identity, origin, location and destination are protected from eavesdroppers. One technique may include encrypting some or all of the information, or not sending the user's identification with the information that is broadcast. In this situation, the mobile communication system may send a message to the MT of the time sequencing on the broadcast channel where their information may be received. After receiving the time sequencing information, the MT can have its broadcast channel receiver receive the broadcast information during the time designated. Other techniques can also be used to protect the user's identity, location, and other information.

In another embodiment, the broadcast system 118 provides radio station coverage extension. For example, the user may receive a favorite radio station using the local radio broadcast channel while in their home locality. Outside the radio station's normal range, the user may request that the station be relayed via the communication network's broadcast system 118. The user would input the desired broadcast stations (broadcast) or network ID (e.g., WNBC FM) into the communication device 200. When outside the radio station's normal range, the user's mobile terminal can interact with the vehicle's radio, for example by transmitting a local signal receivable by the radio or by instructing the radio to tune the appropriate mobile system broadcast channel where the radio station's programs can be received. As the user travels and changes location, the IDS and ISS would assure the radio station's program was available via broadcast system 118. The IDS would for example obtain the radio station program information from the Internet as voice (audio) over IP packets and arrange these for broadcast on the appropriate broadcast channel or transmission site.

In an embodiment where information is broadcast to users who are operating vehicles, it is desirable that the information displayed be helpful but not distracting to the user. To avoid distraction, the information about traffic congestion in the traffic-cam images may be abstracted and presented to the user in a convenient and safe manner. To do this, the images may be accompanied by other information about the traffic flow. The traffic flow may be obtained from traffic counters on the roadways, or it can be extracted from the image or other information source by either a visual observer or some automatic means. For example, image recognition technology may be used to automatically count and report the number and speed of vehicles passing through the image, and optionally convert this data into a qualitative assessment for conveyance to the subscriber.

In an embodiment, traffic flow information is conveyed to the user in a non-distracting manner in the form of audio tones, visually perceptible imagery or lighting, or a combination of audio-visual techniques. The traffic flow rate can be translated into a tone frequency with for example, a reference tone (e.g., middle-C) representing normal flow, and with higher tones representing higher traffic flow rates and lower tones representing lower flows. If these tones are played in the sequence of the MT's journey path, the user will hear a "tune" that represents the traffic conditions ahead. This audio signal generation process can be undertaken at intervals and the user, on hearing, e.g., low (frequency or volume) tones (indicating lower flow and therefore congestion) can decide to select an alternate route, such as by indicating the selection with a button located on the MT or vehicle, or other suitable form of input to the network. This button will select a pre-designated alternate route. After selecting a new route, the ISS 140 can request the information for the new route to be sent over the broadcast channel. This new route would sound out a new sequence of tones (a different "tune") and the user can likewise accept or reject the new route based on its congestion by operating the button.

The sequence of tones can also be accompanied by an audio announcement of the location being displayed (e.g., an intersection or junction monitored by a traffic cam.) This would enable the user to determine which route is being displayed. Typically, the information would be displayed in two sequences. One sequence would combine an announcement of the location name followed by the tone representation of the traffic flow. The other sequence would give only the sequence of traffic flow tones. The user would thus know the normal sequence of the information, and a corresponding sound picture of the overall flow of the route. This method of information "display" minimizes the distraction to the vehicle operator while he/she is driving the vehicle.

An alternative embodiment to the tone technique discussed above would be to use a colored light display on the mobile terminal with, for example, red, yellow and green lighting as indicators of traffic flow for the upcoming junctions. Such lighting could be provided at the terminal display (i.e., all or part of the display turns the color corresponding to the represented condition, such as "red" for traffic congestion), or by way of other color indicia at the mobile terminal. This embodiment would be more appropriate for noisy environments were the tone technique might not work as well, or for use by hearing-impaired subscribers or subscribers otherwise engaged in a telephone call session or the enjoyment of music.

By combining a communication system such as a cellular telephone system or other type of wireless communication system with a broadcast system 118, the present invention removes unnecessary congestion from the communication system, especially for messages that are received and used by multiple MTs, such as MTs 148 and 150. The invention also uses the communication network's signaling and location services in order to determine where and what type of broadcast message the broadcast system 118 is to transmit.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of providing a common communication channel for a plurality of user terminals in a user group, the method comprising:
   receiving a respective stream of media data packets from any of the user terminals in the user group;
   transmitting received media data packets to the plurality of user terminals in the user group, each transmitted media data packet comprising a source user terminal indicator indicating a user terminal from which the media data packet was received;
   receiving the transmitted media data packets at the user terminals; and
   at each receiving user terminal, eliminating any media data packets comprising a source user terminal indicator indicating the receiving user terminal before decoding the received media data packets.

2. The method of claim 1, wherein the media data packets comprise information selected from the group consisting of audio, text messages, data messages and imagery.

3. The method of claim 2, wherein the media data packets comprise speech information.

4. The method of claim 3, wherein the media data packets comprise voice over internet protocol (VoIP) packets.

5. The method of claim 1, wherein transmitting received media data packets comprises:
   selecting at least one stream of received media data packets for transmitting to the user terminals; and
   transmitting the selected at least one received stream of received media data packets.

6. The method of claim 5, wherein:
   the received streams of media data packets comprise audio information; and
   selecting at least one stream of received media data packets comprises selecting a received stream of received media data packets determined to comprise audio information corresponding to a loudest audio signal.

7. A user terminal for use in a communication network providing a common communication channel for a plurality of user terminals in a user group; the user terminal comprising:
   a transmitter operable to transmit a stream of media data packets to a network entity;
   a receiver operable to receive at least one stream of media data packets from the network entity, each received media data packet comprising a source user terminal indicator indicating a user terminal from which the packet data stream was transmitted to the network entity; and
   a decoder operable to decode the received media data packets, the decoder being operable to eliminate any media data packets comprising a source user terminal indicator indicating the receiving user terminal before decoding the received media data packets.

8. The user terminal of claim 7, wherein the media data packets comprise information selected from the group consisting of audio, text messages, data messages and imagery.

9. The user terminal of claim 8, wherein the media data packets comprise speech information.

10. The user terminal of claim 9, wherein the media data packets comprise voice over internet protocol (VoIP) packets.

11. The method of claim 1, further comprising:
    transmitting a weather condition message to the plurality of user terminals; and
    receiving the weather condition message at the user terminals.

12. The method of claim 1, wherein at least some of the media data packets received by the user terminals comprise traffic flow information.

13. The method of claim 12, further comprising translating the traffic flow information by at least one of the user terminals to an audio tone and playing the audio tone by the at least one of the user terminals.

14. The method of claim 12, further comprising translating the traffic flow information by at least one of the user terminals to a colored light and displaying the colored light by the at least one of the user terminals.

15. The method of claim 2, wherein the media data packets comprise audio in Moving Picture Experts Group 4 (MPEG4) format.

16. The user terminal of claim 7, wherein at least some of the media data packets comprise traffic flow information.

17. The user terminal of claim 16, wherein the user terminal translates the traffic flow information to an audio tone and plays the audio tone.

18. The user terminal of claim 16, wherein the user terminal translates the traffic flow information to a colored light and displays the colored light.

19. The user terminal of claim 8, wherein the media data packets comprise audio in Moving Picture Experts Group 4 (MPEG4) format.

20. The user terminal of claim 7, wherein the user terminal is installed in a vehicle.

* * * * *